UNITED STATES PATENT OFFICE.

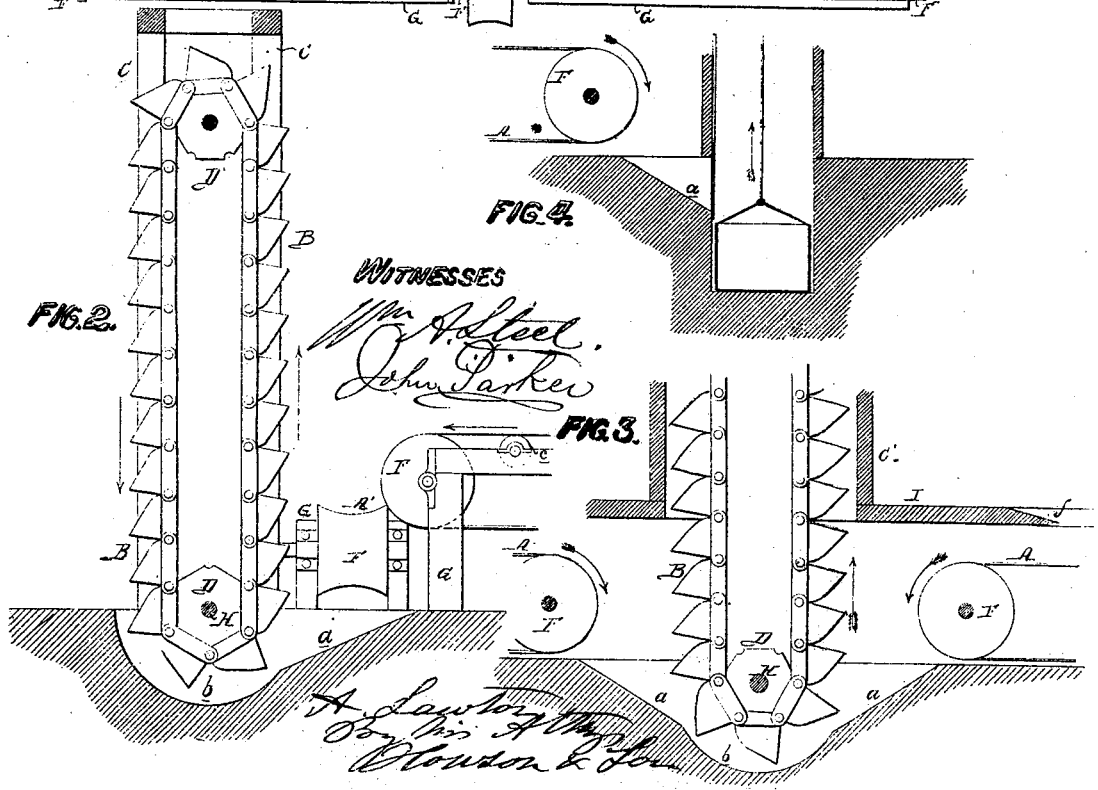

ALFRED LAWTON, OF PHILADELPHIA, PENNSYLVANIA.

IMPROVEMENT IN ELEVATORS.

Specification forming part of Letters Patent No. 106,841, dated August 30, 1870.

I, ALFRED LAWTON, of Philadelphia, county of Philadelphia, State of Pennsylvania, have invented an Improved Method of Moving and Raising Coal and other Granular Material, of which the following is a specification:

Nature and Object of the Invention.

My invention consists of certain improvements, fully described hereafter, in the method of moving and raising coal and other granular material, for which Letters Patent were granted to me on the 13th day of July and on the 16th day of November, A. D. 1869.

Description of the Accompanying Drawing.

Figure 1 is a plan view of one form of apparatus by which my invention may be carried into effect; Fig. 2, a vertical section of part of the same drawn to an enlarged scale; Fig. 3, a view of part of the apparatus slightly modified, and Fig. 4 a view representing a modification.

General Description.

The main feature of the invention for which Letters Patent were granted to me on the 13th day of July, 1869, was sinking a shaft, or its equivalent, in which a hoisting-vessel was arranged so far below the surface of the ground or platform upon which a mass of coal or other material to be raised was piled that the latter would of itself pass into the said hoisting-vessel. (See Fig. 4.) This plan answered well so long as the mass to be raised was piled around or against the shaft, but was ineffectual when the mass was situated at a distance from the latter. To overcome this objection I devised the arrangement for which Letters Patent were granted to me on the 16th day of November, 1869. This consisted of a passage or chamber communicating with the lower end of the shaft, and extending to all points beneath the platform upon which the mass to be moved and elevated was deposited. The hoisting-vessel was made in the form of a car, or was adapted to a truck, so that when lowered to the bottom of the shaft it could be moved through the said passage to any point, however remote, beneath the platform of deposit, and be filled from the mass above, which descended by its own gravity through a trap in the platform. The vessel, when filled, was moved toward the shaft, and elevated in the same in any suitable manner.

My present invention is an improvement upon both of these plans; and consists in the employment of endless-band conveyers, so arranged in the chamber or passages beneath the platform of deposit that the coal or other material may be conveyed from the latter to the elevating devices both automatically and continuously, while the chamber itself need not be of so great a height as would be required for the passage of a car or wheeled truck.

One method of carrying my invention into effect is shown in Figs. 1 and 2, where A, $A^1$, and $A^2$ represent three endless bands of stout canvas, leather, or other suitable material, and of any desired length, which converge toward each other at one end, and terminate at a point directly over an inclined plane or hopper, $a$, which communicates with the space $b$ beneath a chain of buckets, B, the latter being arranged within a vertical or inclined shaft or frame, C, and being turned by chain-wheels D and $D'$, in the usual manner.

Each endless band turns upon rollers F $F'$, hung to any suitable frame, G, and is supported at intervals throughout its length by other smaller rollers, $c$, which also turn in the frame. (See Fig. 2.)

At the outer extremities of the bands A and $A^1$, and at right angles to the same, may be arranged other endless bands, $A^3$ $A^4$, &c.; but these latter should be somewhat higher than the bands A and $A^1$, so as to slightly overhang the same, as shown in Fig. 1.

For the purpose of economizing power I propose to turn all the endless bands simultaneously, and in the direction of their respective arrows, by means of shafts and bevel-gear $d$, or equivalent mechanism, connected with the rollers F, and deriving their motion from the same driving-shaft, H, which operates the chain-wheels and chain of buckets.

The operation of the above mechanism is exceedingly simple. The several bands, which are properly protected at the sides so that they may retain the material upon them, receive the latter in continuous streams from the platform of deposit above, and convey the same immediately toward the inclined plane or hopper $a$, into which it is discharged. The bands $A^3$ and $A^4$, however, first discharge their loads onto the bands $A^1$ and $A^2$, which, in turn, convey the material to the shaft.

The coal or other material, when discharged from the bands, falls by its own gravity into the hopper $a$, it being picked up as fast as discharged by the chain of buckets, elevated by the same to any desired height, and dumped into a chute or onto other conveyers, or into any suitable receptacle prepared to receive it.

The bands $A^3$ and $A^4$, arranged to discharge onto other bands instead of directly into the hopper, can only be employed in cases where it is not essential to limit the height of the chamber beneath the platform of deposit.

When it is desirable that the height of this chamber should be as limited as possible, I prefer to use the arrangement shown in Fig. 3, where I represents a portion of the platform of deposit, and $f$ an opening in the same, through which the material is permitted to fall onto one of the endless-band conveyers. The latter, of which there are two in the present instance, one at each side of the chain of buckets, is placed close to the floor of the chamber, and a closed shaft, $c'$, is used; but it may be opened, if desired.

Although I prefer to use the chain of buckets in combination with the bands, as before described, they may be dispensed with and other elevating devices substituted for the same without departing from the main features of my invention.

A single bucket or other hoisting-vessel arranged to move in a shaft or its equivalent might, for instance, be employed in connection with the conveyers, as shown in Fig. 4.

The endless bands arranged beneath the platform of deposit, as before described, might also be used to a limited extent, independently of the elevating mechanism, for the purpose of conveying coal or other material to a point remote from the said platform prior to discharging it to a lower elevation—as, for instance, into the hold of a vessel.

The above system of moving masses of granular material might be arranged within a collier or other vessel; but it is intended to be used principally at the extensive coal-wharves and depots of railroad or canal companies, as described in my former patent, with the view of dispensing with the usual tedious and costly labor of shifting masses of coal by means of shovels and wheelbarrows.

Claims.

1. The combination, substantially as described, of a bucket or buckets, or any equivalent to the same, by which granular or other material can be hoisted with an endless traversing band or bands, by which the material is conveyed horizontally to or within range of the said buckets.

2. Endless-band conveyers, when arranged in a passage or chamber extending beneath the platform on which is deposited the material to be moved, or moved and raised, all substantially as described.

3. The combination of the elevating mechanism, the endless bands arranged to convey the material to the elevator, and the gearing described, or its equivalent, whereby the elevating mechanism and the endless bands are operated simultaneously and from the same driving-shaft, substantially as specified.

In testimony whereof I have signed my name to this specification in the presence of two subscribing witnesses.

ALFRED LAWTON.

Witnesses:
J. M. COLGAN,
HARRY SMITH.